United States Patent
Okada et al.

(10) Patent No.: US 8,427,138 B2
(45) Date of Patent: Apr. 23, 2013

(54) POSITION SENSOR

(75) Inventors: Kunitaka Okada, Osaka (JP); Masahisa Niwa, Osaka (JP)

(73) Assignee: Panasonic Corporation, Osaka (JP)

( * ) Notice: Subject to any disclaimer, the term of this patent is extended or adjusted under 35 U.S.C. 154(b) by 297 days.

(21) Appl. No.: 13/026,798

(22) Filed: Feb. 14, 2011

(65) Prior Publication Data

US 2011/0304323 A1 Dec. 15, 2011

(30) Foreign Application Priority Data

Jun. 10, 2010 (JP) ................................. 2010-133225

(51) Int. Cl.
*G01B 7/14* (2006.01)
(52) U.S. Cl.
USPC .................................................... 324/207.15
(58) Field of Classification Search .............. 324/207.15
See application file for complete search history.

(56) References Cited

U.S. PATENT DOCUMENTS

2008/0290861 A1   11/2008   Niwa et al.

FOREIGN PATENT DOCUMENTS

| JP | 2001-21383 A | 1/2001 |
| JP | 2008-292376 A | 12/2008 |

OTHER PUBLICATIONS

Abstract of Patent No. JP 2001021383A, Jan. 2001.*

* cited by examiner

*Primary Examiner* — Bot Ledynh
(74) *Attorney, Agent, or Firm* — McDermott Will & Emery LLP

(57) ABSTRACT

The position sensor includes a moving member configured to be displaced in response to displacement of a measurement target, a resonant unit, an oscillation unit, a signal processing unit, an output unit, a signal absence detection unit, and a low-pass filter. The resonant unit includes a detection coil. The oscillation unit is configured to output an oscillation signal. The signal absence detection unit is configured to judge whether or not the oscillation signal is output from the oscillation unit. The low-pass filter is configured to have a cut-off frequency which passes the oscillation signal corresponding to the resonant frequency of the resonant unit in a normal condition, but blocks the oscillation signal output from the oscillation unit when the resonant unit sees an oscillation at an abnormal frequency.

8 Claims, 7 Drawing Sheets

POSITION SENSOR

TECHNICAL FIELD

The present invention is directed to a position sensor which measures displacement of a target.

BACKGROUND ART

In the past, there have been proposed various position sensors configured to measure displacement of a target (e.g., rotational displacement, a rotation angle, or a rotation position of a rotative target). For example, there is a position sensor disclosed in a document 1 (Japanese patent laid-open publication No. 2008-292376). Hereinafter, a conventional instance disclosed in the document 1 is explained with reference to a figure.

As shown in FIG. 7, this conventional instance includes a detection coil 10 and an electrical conductor 20. The detection coil 10 is prepared by winding a conducting wire around a cylindrical core 10a made of nonmagnetic material. The electrical conductor 20 is disposed in a vicinity of an inside or an outside of the detection coil 10 to be displaced in an axial direction of the detection coil 10. The electrical conductor 20 is shaped into a cylindrical shape. Further, the conventional instance includes an oscillation circuit 30 and an oscillation period measurement circuit 40. The oscillation circuit 30 is configured to output an oscillation signal having its magnitude oscillating at a frequency corresponding to an inductance of the detection coil 10. The oscillation period measurement circuit 40 is configured to measure a period of the magnitude of the oscillation signal output from the oscillator 30, and output a signal indicative of the measured period. Moreover, the conventional instance includes a squaring circuit 50, a temperature compensation circuit 60, and a signal processing circuit 70. The squaring circuit 50 is configured to calculate a square value of the signal output from the oscillation period measurement circuit 40, and output the calculated square value. The temperature compensation circuit 50 is configured to compensate for a temperature variation of an output signal from the squaring circuit 50. The signal processing circuit 70 is configured to determine displacement of the electric conductor 20 on the basis of an output signal from the temperature compensation circuit 60.

This conventional instance measures an inductance variation of the detection coil 10 as the displacement of the electric conductor 20 moving together with the target. Thus, the conventional instance can measure the displacement of the target. The period of the oscillation signal includes a component indicative of a square root of an inductance component and a capacitance component. However, the squaring circuit 50 calculates the square value of the period of the oscillation signal and outputs the calculated square value. Therefore, the component indicative of the square root of the inductance component and the capacitance component is canceled. That is, the output signal from the squaring circuit 50 has its magnitude linearly varying with the displacement of the target. Accordingly, the conventional instance can provide the output signal which is convenient for calculation using the same.

With the above conventional instance, in the event of termination of the oscillation caused by breakage of the detection coil 10, no signal is input to the oscillation period measurement circuit 40. After that event, an output of the sensor is not updated anymore. In this situation, even if the electrical conductor 20 is displaced relative to the detection coil 10 after the oscillation is terminated, the output is not changed. Therefore, the sensor keeps outputting erroneous detection information with regard to the displacement of the target. In order to prevent occurrence of erroneous measurement of the displacement of the target, it is preferred to detect a malfunction in the event of the termination of the oscillation, and to output a malfunction detection signal. Such a technique of detecting breakage of the detection coil 10 (electromagnetic pick up) is disclosed in a document 2 (Japanese patent laid-open publication No. 2001-21383).

However, in the aforementioned conventional instances, there occurs an erroneous high frequency oscillation when inductance or capacitance sees a rapid decrease resulting from a malfunction such as layer short of the detection coil 10 and detachment of the capacitor C connected in parallel with the detection coil 10. In a situation where an oscillation at high frequency occurs, the displacement of the target is determined based on a signal having its magnitude oscillating at an abnormal high frequency. Therefore, the conventional position sensor is likely to output erroneous detection information with regard to the displacement of the target.

DISCLOSURE OF INVENTION

In view of the above insufficiency, the present invention has been aimed to propose a position sensor which is capable of preventing erroneous measurement of the displacement of the target due to an oscillation at an abnormal frequency caused by a malfunction of the detection coil or the like.

The first aspect of the position sensor in accordance with the present invention includes a moving member configured to be displaced in response to displacement of a measurement target, a resonant unit, an oscillation unit, a signal processing unit, an output unit, a signal absence detection unit, and a low-pass filter. The resonant unit includes a detection coil arranged to have inductance varied corresponding to displacement of the moving member. The resonant unit is configured to have a resonant frequency determined by the inductance of the detection coil. The oscillation unit is configured to output an oscillation signal having its magnitude oscillating at a frequency corresponding to the resonant frequency. The signal processing unit is configured to determine the displacement of the measurement target on the basis of the oscillation signal. The output unit is configured to output an output signal indicative of the displacement of the measurement target determined by the signal processing unit. The signal absence detection unit is configured to judge whether or not the oscillation signal is output from the oscillation unit. The signal absence detection unit is configured to, upon judging that the oscillation signal is not output from the oscillation unit, output a malfunction detection signal to the signal processing unit. The low-pass filter is interposed between the oscillation unit and the signal absence detection unit. The signal processing unit is configured to, upon receiving the malfunction detection signal, issue occurrence of malfunction. The low-pass filter is configured to have a cut-off frequency which passes the oscillation signal corresponding to the resonant frequency of the resonant unit in a normal condition, but blocks the oscillation signal output from the oscillation unit when the resonant unit sees an oscillation at an abnormal frequency.

The second aspect of the position sensor in accordance with the present invention includes a moving member configured to be displaced in response to displacement of a measurement target, a resonant unit, an oscillation unit, a signal processing unit, an output unit, a signal absence detection unit, and a low-pass filter. The resonant unit includes a detection coil arranged to have inductance varied corresponding to displacement of the moving member. The resonant unit is configured to have a resonant frequency determined by the inductance of the detection coil. The oscillation unit is configured to output an oscillation signal having its magnitude oscillating at a frequency corresponding to the resonant frequency. The signal processing unit is configured to determine the displacement of the measurement target on the basis of the oscillation signal. The output unit is configured to output an output signal indicative of the displacement of the measurement target determined by the signal processing unit. The signal absence detection unit is configured to judge whether or not the oscillation signal is output from the oscillation unit. The signal absence detection unit is configured to, upon judging that the oscillation signal is output from the oscillation unit, deactivate the output unit not to output the output signal. The low-pass filter is interposed between the oscillation unit and the signal absence detection unit. The low-pass filter is configured to have a cut-off frequency which passes the oscillation signal corresponding to the resonant frequency of the resonant unit in a normal condition, but blocks the oscillation signal output from the oscillation unit when the resonant unit sees an oscillation at an abnormal frequency.

BEST MODE FOR CARRYING OUT THE INVENTION

First Embodiment

Figure 1:
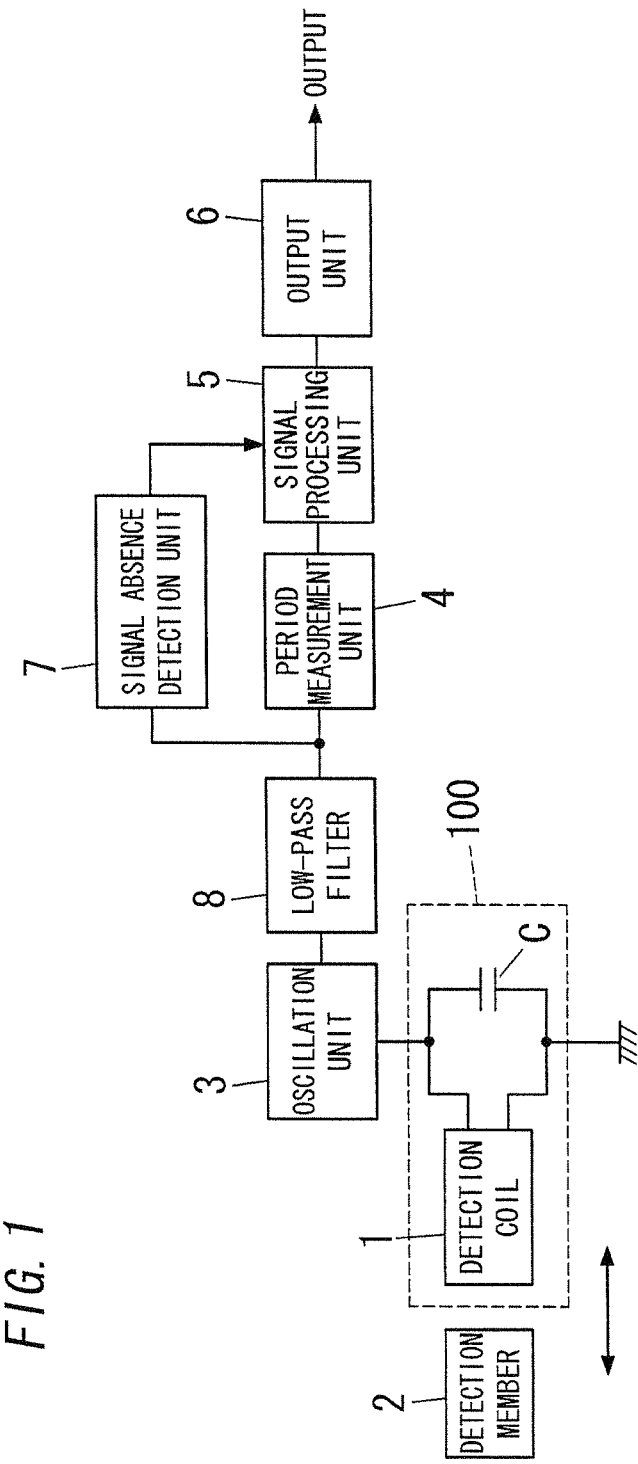
FIG. 1 is a schematic diagram illustrating a position sensor of the first embodiment.
Figure 2:
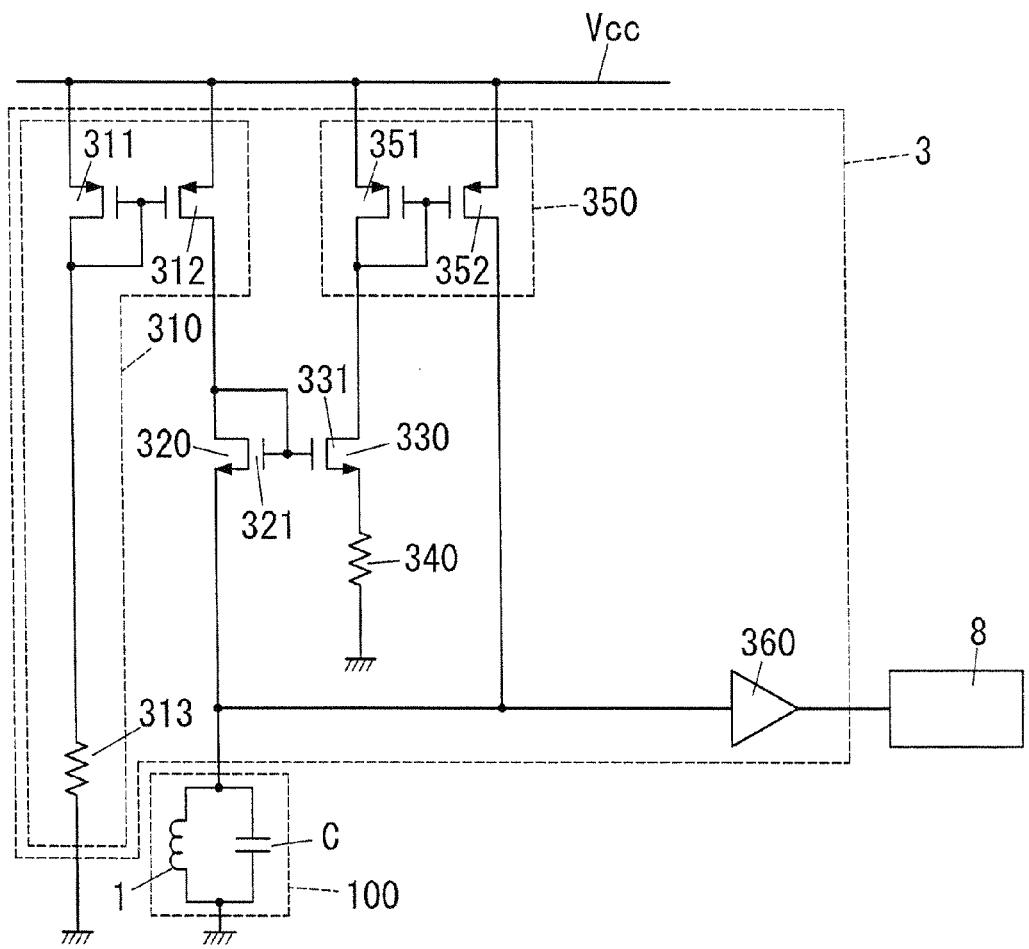
FIG. 2 is a circuit diagram illustrating an oscillation unit of the position sensor of the first embodiment.
Figure 3:
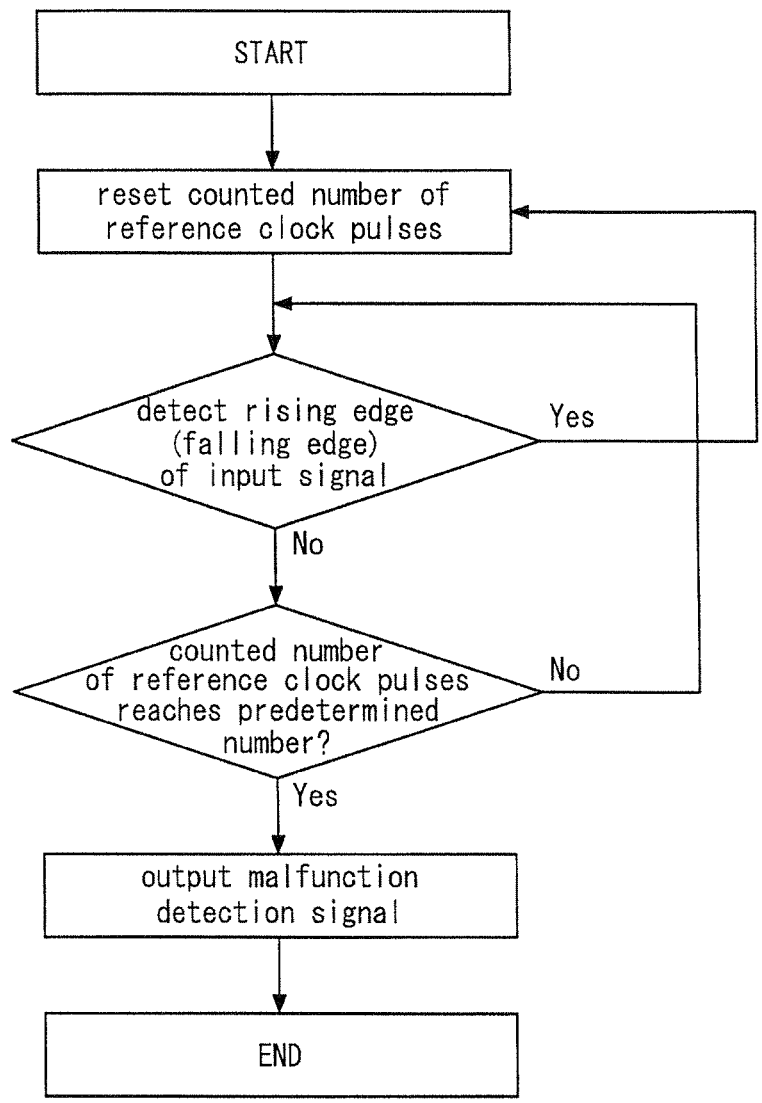
FIG. 3 is a flow-chart illustrating operation of a signal absence detection unit of the position sensor of the first embodiment.

In the following, an explanation is made to a position sensor of the present embodiment, referring to figures. As shown in FIG. 1, the position sensor of the present embodiment includes a detection coil 1 and a detection member (moving member) 2. The detection member 2 is disposed in a vicinity of the detection coil 1. The detection member 2 is configured to move, along a predetermined track in connection with the detection coil 10, together with a target (not shown). Besides, the detection coil 1 is connected in parallel with a capacitor C. A parallel circuit of the detection coil 1 and the capacitor C defines a resonant unit (resonance circuit) 100. As shown in FIG. 2, the resonant unit 100 has its first end connected to a ground, and its second end connected to an oscillation unit 3 which is explained below.

In other words, the position sensor of the present embodiment includes the moving member 2 configured to be displaced in response to the displacement of the target (measurement target), and the resonant unit 100. The resonant unit 100 includes the detection coil 1 arranged to have its inductance which is varied corresponding to displacement of the moving member 2. The resonant unit 100 has a resonant frequency which is determined by the inductance of the detection coil 1. According to the position sensor of the present embodiment, the resonant unit 100 includes the capacitor C connected in parallel with the detection coil 1. The resonant frequency is determined by the inductance of the detection coil 1 and capacitance of the capacitor C.

In addition, the position sensor of the present embodiment includes the oscillation unit (oscillation circuit) 3 and a period measurement unit (period measurement circuit) 4. The oscillation unit 3 is configured to output an oscillation signal having its magnitude oscillating at a frequency corresponding to the inductance of the detection coil 1. The period measurement unit 4 is configured to output an output signal having its magnitude corresponding to a period of the magnitude of the oscillation signal output from the oscillation unit 3.

The oscillation unit 3 is configured to keep the resonant unit 100 oscillating. Further, the oscillation unit 3 is configured to output the oscillation signal having its magnitude which oscillates at a frequency corresponding to the resonant frequency of the resonant unit 100. FIG. 2 shows an instance of a circuit configuration of the oscillation unit 3.

As shown in FIG. 2, the oscillation unit 3 includes a bias circuit 310, a level shift circuit 320, an amplifier 330, a resistor 340, a current feedback circuit 350, and a buffer amplifier 360.

The bias circuit 310 is defined to be a constant current source providing a constant bias current to the resonant unit 100 from an internal power source Vcc. The bias circuit 310 includes two n-type MOSFETs 311 and 312, and a resistor 313. The two MOSFETs 311 and 312 constitute a current mirror circuit. The MOSFET 311 has its source connected to the internal power source Vcc, and its gate connected to its drain. The MOSFET 311 has its drain connected to the ground via the resistor 313. The MOSFET 311 has its gate connected to a gate of the MOSFET 312. The MOSFET 312 has its source connected to the internal power source Vcc. The MOSFET 312 has its drain connected to the second end of the resonant unit 100 via the level shift circuit 320.

In the bias circuit 310, the resistance of the resistor 313 determines magnitude of a current flowing through the MOSFET 311 between the source and the drain. The resistor 313 is used for determining magnitude of the bias current. Since the MOSFETs 311 and 312 constitute the current mirror circuit, a current flowing through the MOSFET 312 between the source and the drain has the same magnitude as that of the current flowing through the MOSFET 311 between the source and the drain. The current flowing through the MOSFET 312 between the source and the drain is supplied, as the bias current, to the resonant unit 100.

The level shift circuit 320 is configured to shift magnitude of an oscillation voltage of the resonant unit 100 (i.e, a voltage applied across the resonant unit 100). The level shift circuit 320 includes a p-type MOSFET 321. The MOSFET 321 has its source connected to the second end of the resonant unit 100, and its drain connected to the drain of the MOSFET 312. In addition, the MOSFET 321 has its drain connected to its gate. According to the illustrated instance, the parallel circuit of the detection coil 1 and the capacitor C is interposed between the source of the MOSFET 321 and the ground.

With regard to the level shift circuit 320, an electrical potential of the source of the MOSFET 321 becomes equal to an electrical potential of the second end of the resonant unit 100 (a voltage of the source of the MOSFET 321 is equal to the oscillation voltage of the resonant unit 100). The level-shift circuit 320 shifts the oscillation voltage by an extent of a gate-source voltage of a p-type MOSFET 331 of the amplifier 330. Therefore, a voltage applied across the source of the MOSFET 331 and the ground is made equal to the oscillation voltage of the resonant unit 100 only for a positive half cycle of the oscillation of the resonant unit 100.

The amplifier 330 is configured to output a current which is proportional to the oscillation voltage of the resonant unit 100. The amplifier 330 includes the aforementioned MOSFET 331. The MOSFET 331 has its source connected to the ground via the resistor 340. In brief, the source of the MOSFET 331 is grounded. The resistor 340 is used for adjustment of an electrical potential of the source of the amplifier 330. That is, the amplifier 330 is a source follower circuit. The MOSFET 331 has its gate is connected to the gate of the MOSFET 321. The electrical potential of the source of the MOSFET 321 shifted by the level shift circuit 320 (i.e., a level-shift voltage generated by the level-shift circuit 320) is applied to the gate of the MOSFET 331. Accordingly, the amplifier 330 outputs a current of a level corresponding to magnitude of the oscillation voltage of the resonant unit 100.

The current feedback circuit 350 is configured to supply a feedback current to the resonant unit 100. The feedback current is defined to be a current corresponding to a current output from the amplifier 330. The current feedback circuit 350 keeps the resonant unit 100 oscillating while supplying the feedback current to the resonant unit 100. According to the present embodiment, the feedback current is identical to the current output from the amplifier 330. The current feedback circuit 350 is a current mirror circuit constituted by two n-type MOSFETs 351 and 352. The current feedback circuit 350 supplies a current to the resonant unit 100 by means of positive feedback control in order to keep the resonant unit 100 oscillating. The MOSFET 351 has its source connected to the internal power source Vcc, and its drain connected to the drain of the MOSFET 331 of the amplifier 330. The drain and the gate of the MOSFET 351 are connected to each other. The MOSFET 351 has its gate connected to a gate of the MOSFET 352. The MOSFET 352 has its source connected to the internal power source Vcc, and its drain connected to the second end of the resonant unit 100.

The buffer amplifier 360 has its input terminal connected to the second end of the resonant unit 100. In the present embodiment, an output terminal of the buffer amplifier 360 is defined as an output terminal of the oscillation unit 3.

As to the oscillation unit 3, the resistance of the resistor 340 determines magnitude of the feedback current output from the current feedback circuit 350. With use of the resistor 340 of sufficiently-small resistance, it is possible to keep the resonant unit 100 oscillating irrespective of a change in the inductance of the detection coil 1 and/or the capacitance of the capacitor C.

Alternatively, the oscillation unit 3 may include a feedback circuit configured to adjust the resistance of the resistor 340 to keep the resonant unit 100 oscillating. Besides, a cascode circuit comprising plural MOSFETs can be used instead of each of the MOSFETs 311, 312, 321, 322, 351, and 352.

In addition, the position sensor of the present embodiment includes a signal processing unit 5 and an output unit 6. The signal processing unit 5 is configured to determine, on the basis of the output signal from the period measurement unit 4, the displacement of the target which moves together with the detection member 2. The output unit 6 is configured to output a signal including information indicative of the displacement of the target measured by the signal processing unit 5. In other words, the position sensor includes the signal processing unit 5 and the output unit 6. The signal processing unit 5 is configured to determine the displacement of the measurement target on the basis of the oscillation signal. The output unit 6 is configured to output the signal (output signal) indicative of the displacement of the measurement target determined by the signal processing unit 5. The output unit 6 includes an external device such as a display (not shown) and a buzzer (not shown), an interface for transmitting signals to or receiving signals from a control system using information of the displacement of the target, and a D/A converter.

Connected to the rear side of the oscillation unit 3 is a signal absence detection unit 7 which judges whether or not the oscillation signal is output from the oscillation unit 3, and notifies the signal processing unit 5 of an occurrence of the malfunction when the oscillation signal is absence. In other words, the signal absence detection unit 7 is configured to judge whether or not the oscillation signal is output from the oscillation unit 3. The signal absence detection unit 7 is configured to, upon judging that the oscillation signal is not output from the oscillation unit 3, output a malfunction detection signal to the signal processing unit 5.

The signal processing unit 5 is configured to, upon receiving the malfunction signal, issue an occurrence of the malfunction.

In addition, between the oscillation unit 3 and the signal absence detection unit 7 is interposed the low-pass filter 8 which is configured to block a signal having its magnitude oscillating at a frequency higher than that of the oscillation signal within a normal range.

In brief, the position sensor of the present embodiment includes the low-pass filter 8 interposed between the oscillation unit 3 and the signal absence detection unit 7.

The low-pass filter 8 is configured to have a cut-off frequency which passes the oscillation signal corresponding to the resonant frequency of the resonant unit 100 in a normal condition, but blocks the oscillation signal output from the oscillation unit 3 when the resonant unit 100 sees an oscillation at an abnormal frequency.

The resonant frequency (i.e., the frequency of the oscillation signal) f of the resonant unit 100 is represented by the following formula (1), wherein L1, C1, and C2 denote the inductance of the detection coil 1, the capacitance of the capacitor C, and parasitic capacitance of the resonant unit 100, respectively.

[FORMULA 1]

$$f = \frac{1}{2\pi\sqrt{L1 \times (C1 + C2)}} \quad (1)$$

The inductance L1 of the detection coil 1 is varied depending on a distance between the detection coil 1 and the moving member 2. The minimum value f1 of the resonant frequency f of the resonant unit 100 in the normal condition is represented by the following formula (2), wherein $L1_{max}$ denotes the maximum of the inductance L1 of the detection coil 1. In addition, the maximum value f2 of the resonant frequency f of the resonant unit 100 in the normal condition is represented by the following formula (3), wherein $L1_{min}$ denotes the minimum of the inductance L1 of the detection coil 1.

[FORMULA 2]

$$f1 = \frac{1}{2\pi\sqrt{L1_{max} \times (C1 + C2)}} \quad (2)$$

-continued $$f2 = \frac{1}{2\pi\sqrt{L1_{min} \times (C1+C2)}} \quad (3)$$

The resonant unit 100 is judged to be in a malfunction condition when layer short occurs in the detection coil 1, or the capacitor C is detached.

The layer short in the detection coil 1 results in a decrease of the inductance L1 of the detection coil 1. When the excess layer short occurs in the detection coil 1, the inductance L1 of the detection coil 1 is considerably decreased from the minimum $L1_{min}$. As a result, the resonant frequency f in the malfunction condition may exceed, by a greater extent, the maximum value f2 of the resonant frequency f of the resonant unit 100 in the normal condition. In this situation, the resonant unit 100 oscillates at a considerably high frequency.

When the capacitor C is detached, the capacitance of the resonant unit 100 is extremely decreased. Therefore, the resonant frequency f in the malfunction condition may exceed, by a greater extent, the maximum value f2 of the resonant frequency f of the resonant unit 100 in the normal condition. For example, when the resonant frequency f of the resonant unit 100 devoid of the capacitor C is defined as fa, fa is represented by the following formula (4).

[FORMULA 3]

$$fa = \frac{1}{2\pi\sqrt{L1 \times C2}} \quad (4)$$

This resonant frequency fa is higher than the resonant frequency f of the resonant unit 100 in the normal condition. Additionally, the minimum value f3 of the resonant frequency fa of the resonant unit 100 in the malfunction condition is represented by the following formula (5). Further, the maximum value f4 of the resonant frequency fa of the resonant unit 100 in the malfunction condition is represented by the following formula (6).

[FORMULA]

$$f3 = \frac{1}{2\pi\sqrt{L1_{max} \times C2}} \quad (5)$$

$$f4 = \frac{1}{2\pi\sqrt{L1_{min} \times C2}} \quad (6)$$

In general, a relation of f1<f2<f3<f4 is fulfilled. In the present embodiment, the cut-off frequency fc of the low-pass filter 8 is selected to fulfill a relation of f2<fc<f3. Besides, the cut-off frequency fc may be equal to 2*f2. In this instance, the cut-off frequency fc is required not to exceed f3. Alternatively, the cut-off frequency fc may be equal to (f2+f3)/2.

As explained in the above, in the position sensor of the present embodiment, the low-pass filter 8 is configured to block the oscillation signal output from the oscillation unit 3 upon occurrence of layer-shorting of the detection coil 1. Further, the low-pass filter 8 is configured to block the oscillation signal output from the oscillation unit 3 in response to a removal of the capacitor C. Besides, the low-pass filter 8 may be an analog filter or a digital filter. Alternatively, the low-pass filter 8 may be configured to have the cut-off frequency fc to block the oscillation signal having its magnitude oscillating at a frequency higher than the maximum value f2. In other words, the low-pass filter 8 is configured to have the cut-off frequency which blocks the oscillation signal oscillating at the abnormal frequency which is higher than that of the oscillation signal having its magnitude oscillating at a frequency within the normal range (f1 to f2) defined between the maximum value $L1_{max}$ and the minimum value $L1_{min}$ of the inductance L of the detection coil 1. Alternatively, the low-pass filter 8 may be a band-pass filter configured to pass only the oscillation signal having its magnitude oscillating at a frequency within the normal range of f1 to f2.

Besides, configurations and operation of each unit of the position sensor with the exception of the output unit 6, the signal absence detection unit 7, and the low-pass filter 8 are known, as disclosed in the document 1. Consequently, no detailed explanations thereof are deemed necessary. Further, in the present embodiment, the signal processing unit 5 determines the displacement of the target which moves together with the detection member 2 on the basis of the signal output from the period measurement unit 4. However, the signal processing unit 5 may have the same configuration as the prior art. That is, the signal processing unit 5 may be configured to determine the displacement of the target which moves together with the detection member 2 on the basis of the signal output from the period measurement unit 4 through the squaring circuit 50 and the temperature compensation circuit 60.

In the following, an explanation is made to a configuration and operation of the signal absence detection unit 7, referring to FIG. 2. The signal absence detection unit 7 comprises a micro computer, for example. The signal absence detection unit 7 counts the number of reference clock pulses output at a predetermined frequency by means of a timer-count function. The oscillation signal which is output from the oscillation unit 3 and passes through the low-pass filter 8 is input to the signal absence detection unit 7. Upon seeing the rising edge or the falling edge of the input signal, the signal absence detection unit 7 resets the counted number of the reference clock pulses, and restarts counting the number of the reference clock pulses from zero. When the counted number of the reference clock pulses becomes equal to a predetermined number (in other words, when a condition where the input signal sees no rising edge or falling edge is kept over a predetermined period), the signal absence detection unit 7 judges that the oscillation signal is not input to the signal absence detection unit 7. Thus, the signal absence detection unit 7 detects the malfunction. Upon detecting the malfunction, the signal absence detection unit 7 sends, to the signal processing unit 5, the malfunction detection signal for notification of the occurrence of the malfunction.

Upon receiving the malfunction detection signal, the signal processing unit 5 controls the output unit 6 to execute various processing. For example, the signal processing unit 5 controls the display to indicate an image for indication of the occurrence of the malfunction, or controls the buzzer to produce warning sound for indication of the occurrence of the malfunction.

In the present embodiment, since the low-pass filter 8 is interposed between the oscillation unit 3 and the signal absence detection unit 7, it is possible to block a high frequency signal when an oscillation at an abnormal high frequency occurs due to malfunctions such as the layer short in the detection coil 1 and the detachment of the capacitor C. Therefore, in a situation where the oscillation at the abnormal high frequency, the oscillation signal can not pass through the low-pass filter 8. In brief, the input signal of the signal absence detection unit 7 sees no rising edge and falling edge.

Consequently, as described in the above, when the counted number of the reference clock pulses becomes equal to the predetermined number (in other words, when a condition where the input signal sees no rising edge or falling edge is kept over the predetermined period), the signal absence detection unit 7 judges that the oscillation signal is not input to the signal absence detection unit 7. Thus, the signal absence detection unit 7 detects the malfunction.

As mentioned in the above, the position sensor of the present embodiment includes the moving member 2 configured to be displaced in response to the displacement of the measurement target, the resonant unit 100, the oscillation unit 3, the signal processing unit 5, the output unit 6, the signal absence detection unit 7, and the low-pass filter 8. The resonant unit 100 includes the detection coil 1 arranged to have inductance varied corresponding to the displacement of the moving member 2. The resonant unit 100 is configured to have the resonant frequency determined by the inductance of the detection coil 1. The oscillation unit 3 is configured to output the oscillation signal having its magnitude oscillating at a frequency corresponding to the resonant frequency. The signal processing unit 5 is configured to determine the displacement of the measurement target on the basis of the oscillation signal. The output unit 6 is configured to output the output signal indicative of the displacement of the measurement target determined by the signal processing unit 5. The signal absence detection unit 7 is configured to judge whether or not the oscillation signal is output from the oscillation unit 3. The signal absence detection unit 7 is configured to, upon judging that the oscillation signal is output from the oscillation unit 3, output the malfunction detection signal to the signal processing unit 5. The low-pass filter 8 is interposed between the oscillation unit 3 and the signal absence detection unit 7. The signal processing unit 5 is configured to, upon receiving the malfunction detection signal, issue the occurrence of the malfunction. The low-pass filter 8 is configured to have the cut-off frequency which passes the oscillation signal corresponding to the resonant frequency of the resonant unit 100 in the normal condition, but blocks the oscillation signal output from the oscillation unit 3 when the resonant unit 100 sees an oscillation at an abnormal frequency.

As described in the above, the present embodiment can block the oscillation signal by use of the low-pass filter 8 in the event of occurrence of high frequency oscillation caused by malfunctions (e.g., the layer short in the detection coil 1 and the detachment of the capacitor C). Since the oscillation signal having its magnitude oscillating at an abnormal high frequency is blocked, the signal absence detection unit 7 regards the oscillation signal to be absence, and thereby detects the malfunction. Therefore, it is possible to prevent erroneous measurement of the displacement of the target due to an oscillation at an abnormal frequency caused by a malfunction of the detection coil 1 or the like. In addition, the low-pass filter 8 is combined with the signal absence detection unit 7 to realize a single circuit which can detect stop of oscillation caused by breakage of the detection coil 1 as well as occurrence of abnormal high frequency oscillation caused by the malfunction of the detection coil 1 or the like.

Besides, the configuration of the signal absence detection unit 7 in the present embodiment is not limited to the aforementioned configuration, but may be selected from any other configurations provided that it is configured to detect the oscillation signal output from the oscillation unit 3 and issue the occurrence of the malfunction to the signal processing unit 5 upon detecting no oscillation signal.

Second Embodiment

Figure 4:
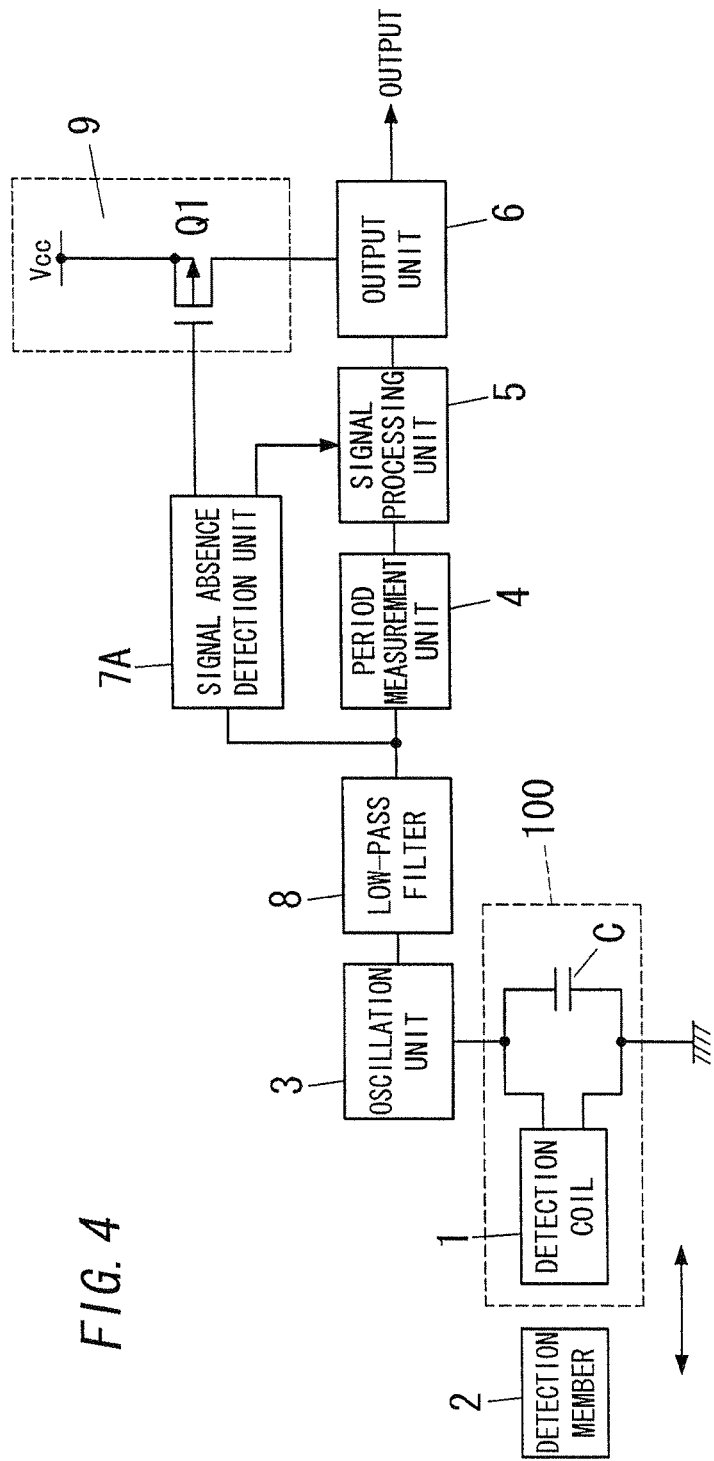
FIG. 4 is a schematic diagram illustrating a position sensor of the second embodiment.

As shown in FIG. 4, the position sensor of the present embodiment is different from the position sensor of the first embodiment in operation of the signal absence detection unit 7A. In addition, the position sensor of the present embodiment includes a power supply unit 9. As shown in FIG. 4, in the position sensor of the present embodiment, the power supply unit 9 is interposed between the signal absence detection unit 7A and the output unit 6. The power supply unit 9 is configured to supply operation power to the output unit 6 so as to keep the same operating. The power supply unit 9 terminates supplying the operation power to the output unit 6 when the signal absence detection unit 7A detects the malfunction.

The power supply unit 9 includes the internal power source (operation power source) Vcc for supplying the operation power to the output unit 6, and a switching element Q1 which is a p-type MOSFET and is connected between the power supply unit 9 and the output unit 6. The switching element Q1 has its gate connected to the signal absence detection unit 7A, its source connected to the operation power source Vcc, and its drain connected to the output unit 6. The signal absence detection unit 7A is configured to adjust a gate voltage applied to the gate of the switching element Q1.

In brief, the signal absence detection unit 7A in the present embodiment is configured to judge whether or not the oscillation signal is output from the oscillation unit 3, and to control the power supply unit 9 to deactivate the output unit 6 not to output the output signal upon judging that the oscillation signal is not output from the oscillation unit 3.

In the following, an explanation is made to operation of the power supply unit 9. While the signal absence detection unit 7A does not detect the malfunction, the signal absence detection unit 7A adjusts the gate voltage to turn on the switching element Q1. Therefore, the operation power is supplied to the output unit 6 from the power supply unit 9. Upon detecting the malfunction, the signal absence detection unit 7A applies, to the gate of the switching element Q1, the same voltage as that of the operation power source Vcc. Accordingly, the switching element Q1 is turned off, and an electrical line between the operation power source Vcc and the output unit 6 is opened. As a result, supply of the operation power from the power supply unit 9 to the output unit 6 is terminated.

As mentioned in the above, the position sensor of the present embodiment includes the moving member 2 configured to be displaced in response to the displacement of the measurement target, the resonant unit 100, the oscillation unit 3, the signal processing unit 5, the output unit 6, the signal absence detection unit 7, and the low-pass filter 8. The resonant unit 100 includes the detection coil 1 arranged to have inductance varied corresponding to the displacement of the moving member 2. The resonant unit 100 is configured to have the resonant frequency determined by the inductance of the detection coil 1. The oscillation unit 3 is configured to output the oscillation signal having its magnitude oscillating at a frequency corresponding to the resonant frequency. The signal processing unit 5 is configured to determine the displacement of the measurement target on the basis of the oscillation signal. The output unit 6 is configured to output the output signal indicative of the displacement of the measurement target determined by the signal processing unit 5. The signal absence detection unit 7 is configured to judge whether or not the oscillation signal is output from the oscillation unit 3. The signal absence detection unit 7 is configured to, upon judging that the oscillation signal is output from the oscillation unit 3, deactivate the output unit 6 not to output the output signal. The low-pass filter 8 is interposed between the oscillation unit 3 and the signal absence detection unit 7. The low-pass filter 8 is configured to have the cut-off frequency which passes the oscillation signal corresponding to the resonant frequency of the resonant unit 100 in the normal condition, but blocks the oscillation signal output from the oscillation unit 3 when the resonant unit 100 sees an oscillation at an abnormal frequency.

Consequently, when the malfunction occurs in the detection coil 1 or the like, supply of the operation power to the output unit 6 can be terminated. Therefore, power consumption can be reduced. Besides, in the present configuration, the operation of the output unit 6 is terminated. Therefore, the aforementioned alarm operation by means of the external display or buzzer is not carried out.

Besides, the position sensor of the second embodiment may includes the output unit 6 which is connected to the rear side of the signal processing unit 5 and configured to output the signal including information indicative of the displacement of the target measured by the signal processing unit 5. In this instance, the output unit 6 includes a power supply unit (not shown) configured to provide the operation power to keep the output unit 6 operating. The aforementioned power supply unit is configured to terminate supply of the operation power to the output unit 6 when the signal absence detection unit 7A detects the malfunction.

Additionally, the configuration of the power supply unit 9 in the present embodiment is not limited to the aforementioned configuration, but may include any configuration that terminate supplying the operation power to the output unit 6 when the signal absence detection unit 7A detects the malfunction.

Besides, in the aforementioned explanations (the first embodiment and the second embodiment), the detection coil 1 and the detection member 2 have the same configurations as those of the prior art, and each of the position sensors shown in the aforementioned explanations is a linear position sensor in which the detection member 2 is configured to be moved along a linear track. In brief, the detection coil 1 is prepared by winding a conducting wire around a cylindrical core (not shown) made of nonmagnetic material. The detection member 2 is defined to be an electrical conductor which is disposed in a vicinity of an inside or an outside of the detection coil 1 to be displaced in an axial direction of the detection coil 1. However, the configurations of the detection coil 1 and the detection member 2 are not limited to the aforementioned configurations, but may include any configuration that processes variation of the oscillation frequency.

Figure 5:
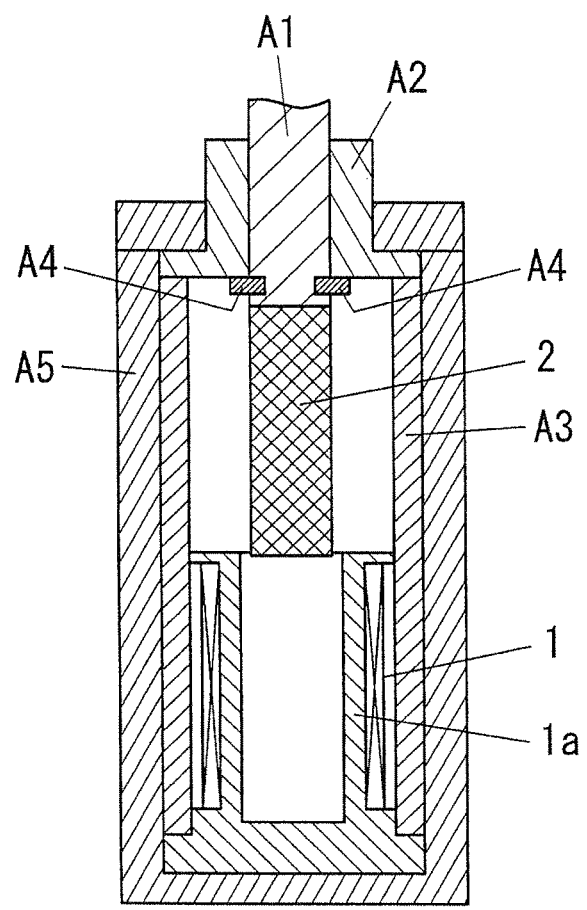
FIG. 5 is a schematic diagram illustrating a linear position sensor.

In the following, explanations are made to other configurations, referring to the figures. First, an instance of the other linear position sensor is explained. As shown in FIG. 5, this instance includes the detection coil 1 comprising an conducting wire wound around a cylindrical bobbin 1a, the bar-shaped detection member 2 disposed inside the bobbin 1a to move along an axial direction thereof, and a guide unit A1 linking the detection member 2 with the target. Further, this instance includes a supporting unit A2 and a shield member A3. The supporting unit A2 is configured to movably support the guide unit A1 in the axial direction such that the detection member 2 moves along the axial direction without coming into contact with the inner peripheral surface of the detection coil 1. The shield member A3 for magnetic shield is configured to cover an external peripheral surface of the detection coil 1. Moreover, this instance includes a stopper unit A4. The stopper unit A4 is configured to restrict movement of the guide unit A1 such that the guide unit A1 does not come into the inside of the detection coil 1, and is configured to restrict movement of the detection member 2 such that the detection member 2 does not come into contact with the supporting unit A2. The detection coil 1, the detection member 2, the guide unit A1, the supporting unit A2, the shield member A3, and the stopper unit A4 are housed in a case A5. Also in this instance, by determining the displacement of the detection member 2 moving in association with the target on the basis of the inductance variation of the detection coil 1, the displacement of the target can be determined.

Figure 6:
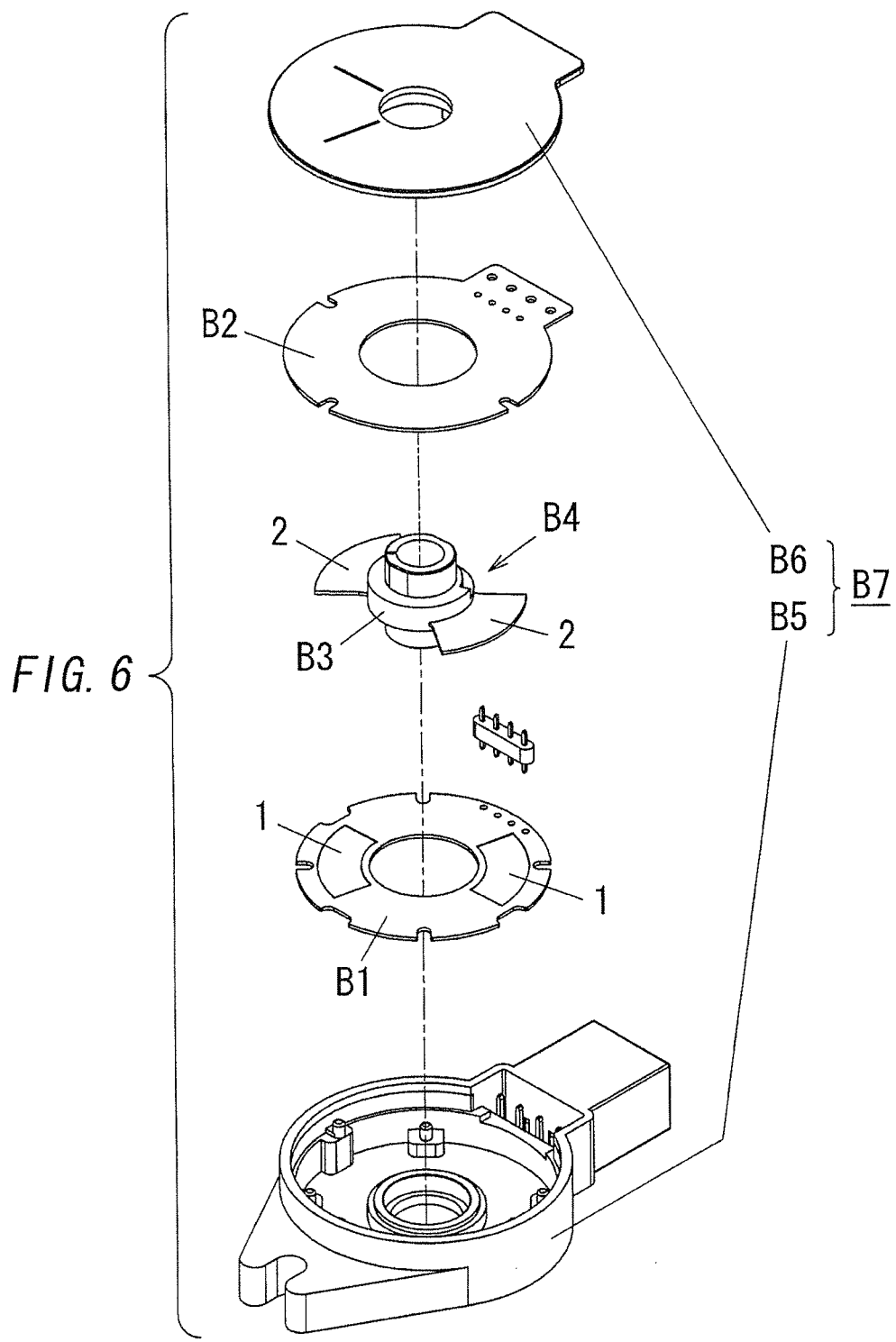
FIG. 6 is a schematic diagram illustrating a rotary position sensor.
Figure 7:
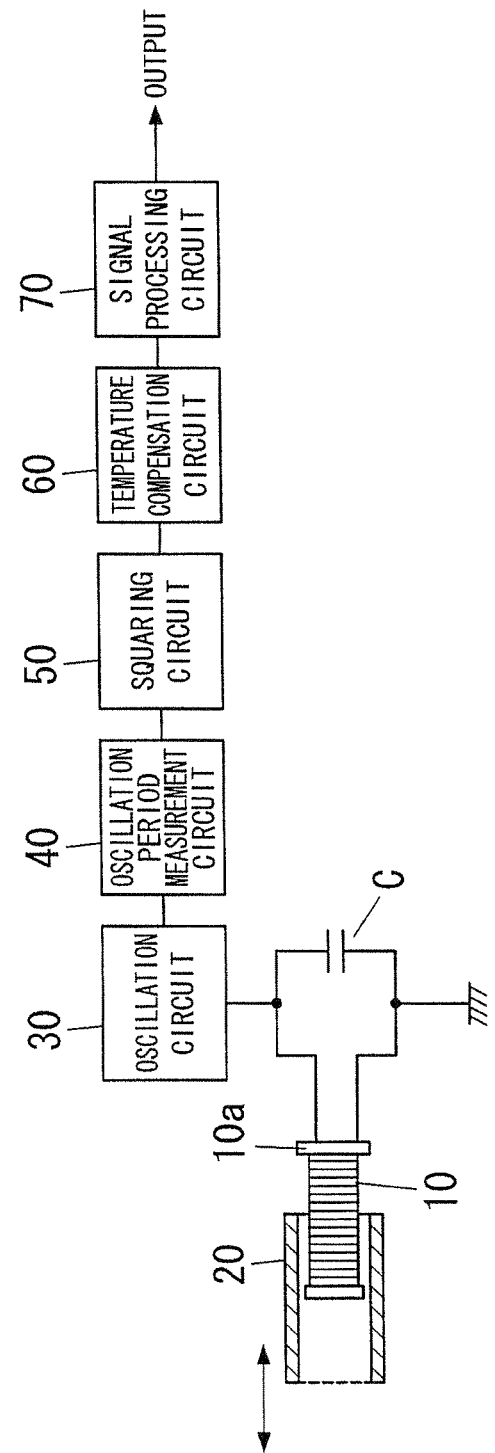
FIG. 7 is a schematic diagram illustrating a prior position sensor.

The following explains an instance of a rotary position sensor. As shown in FIG. 6, this instance includes a first dielectric substrate B1 and a second dielectric substrate B2. The first dielectric substrate B1 has a surface on which a pair of the detection coils 1 is printed. The second dielectric substrate B2 has a surface on which a pair of the detection coils (not shown) is printed. Further, this instance includes a pair of the detection members 2 and a rotor block B4. Each detection member 2 is shaped into a fan shape and is made of nonmagnetic material. The rotor block B4 includes a holding member B3 configured to hold each detection member 2. The first and second dielectric substrates B1 and B2 and the rotor block B4 are housed in a case B7. The case B7 comprises a box-shaped body B5 provided with an opening in its surface, and a cover B6 coupled to the body B5 to cover the opening of the body B5.

In the following, brief explanation is made to operation of the above position sensor. When the holding member B3 of the rotor block B4 moving together with the target is caused to rotate in response to the displacement of the target, each of the detection members 2 which are spaced from each other at an angular interval of 180 degree is moved along a circular track in association with the movement of the holding member B3. The oscillation unit 3 (see FIG. 1) outputs the oscillation signals having frequencies respectively corresponding to the inductances of the respective detection coils which vary depending on relative positions of the respective detection members 2 in relation to the two pairs of the detection coils. By determining the displacement of each of the detection members 2 on the basis of the oscillation signals, it is possible to obtain information indicative of the relational positions of the respective detection members 2 relative to the two pairs of the detection coils (i.e., rotational displacement of the target moving together with the rotor block B4).

The invention claimed is:

1. A position sensor comprising:
    a moving member configured to be displaced in response to displacement of a measurement target;
    a resonant unit including a detection coil arranged to have inductance varied corresponding to displacement of said moving member, said resonant unit being configured to have a resonant frequency determined by the inductance of said detection coil;
    an oscillation unit configured to output an oscillation signal having its magnitude oscillating at a frequency corresponding to the resonant frequency;
    a signal processing unit configured to determine the displacement of said measurement target on a basis of the oscillation signal;
    an output unit configured to output an output signal indicative of the displacement of said measurement target determined by said signal processing unit;
    a signal absence detection unit configured to judge whether or not the oscillation signal is output from said oscillation unit, said signal absence detection unit being configured to, upon judging that the oscillation signal is not output from said oscillation unit, output a malfunction detection signal to said signal processing unit; and
    a low-pass filter interposed between said oscillation unit and said signal absence detection unit,
    wherein said signal processing unit is configured to, upon receiving the malfunction detection signal, issue occurrence of malfunction, said low-pass filter being configured to have a cut-off frequency which passes the oscillation signal corresponding to the resonant frequency of said resonant unit in a normal condition, but blocks the oscillation signal output from said oscillation unit when said resonant unit sees an oscillation at an abnormal frequency.

2. A position sensor comprising:

a moving member configured to be displaced in response to displacement of a measurement target;

a resonant unit including a detection coil arranged to have inductance varied corresponding to displacement of said moving member, said resonant unit being configured to have a resonant frequency determined by the inductance of said detection coil;

an oscillation unit configured to output an oscillation signal having its magnitude oscillating at a frequency corresponding to the resonant frequency;

a signal processing unit configured to determine the displacement of said measurement target on a basis of the oscillation signal;

an output unit configured to output an output signal indicative of the displacement of said measurement target determined by said signal processing unit;

a signal absence detection unit configured to judge whether or not the oscillation signal is output from said oscillation unit, said signal absence detection unit being configured to, upon judging that the oscillation signal is output from said oscillation unit, deactivate said output unit not to output the output signal; and a low-pass filter interposed between said oscillation unit and said signal absence detection unit, wherein said low-pass filter being configured to have a cut-off frequency which passes the oscillation signal corresponding to the resonant frequency of said resonant unit in a normal condition, but blocks the oscillation signal output from said oscillation unit when said resonant unit sees an oscillation at an abnormal frequency.

3. The position sensor as set forth in claim 1, wherein said low-pass filter is configured to have the cut-off frequency which blocks the oscillation signal oscillating at the abnormal frequency which is higher than that of the oscillation signal having its magnitude oscillating at a frequency within a normal range defined between a maximum value and a minimum value of the inductance of said detection coil.

4. The position sensor as set forth in claim 1, wherein said low-pass filter is configured to block the oscillation signal output from said oscillation unit upon occurrence of layer-shorting of said detection coil.

5. The position sensor as set forth in claim 1, wherein said resonant unit includes a capacitor connected in parallel with said detection coil, said resonant frequency being determined by the inductance of said detection coil and capacitance of said capacitor, and said low-pass filter being configured to block the oscillation signal output from said oscillation unit in response to a removal of said capacitor.

6. The position sensor as set forth in claim 2, wherein said low-pass filter is configured to have the cut-off frequency which blocks the oscillation signal oscillating at the abnormal frequency which is higher than that of the oscillation signal having its magnitude oscillating at a frequency within a normal range defined between a maximum value and a minimum value of the inductance of said detection coil.

7. The position sensor as set forth in claim 2, wherein said low-pass filter is configured to block the oscillation signal output from said oscillation unit upon occurrence of layer-shorting of said detection coil.

8. The position sensor as set forth in claim 2, wherein said resonant unit includes a capacitor connected in parallel with said detection coil, said resonant frequency being determined by the inductance of said detection coil and capacitance of said capacitor, and said low-pass filter being configured to block the oscillation signal output from said oscillation unit in response to a removal of said capacitor.

\* \* \* \* \*